Nov. 3, 1970 W. KAMERON 3,538,402

HIGH VOLTAGE ENERGY CAPACITOR

Filed Nov. 18, 1968 2 Sheets-Sheet 1

INVENTOR.
WILLIAM KAMERON
BY
ATTORNEY

INVENTOR
WILLIAM KAMERON
BY
ATTORNEY

3,538,402
HIGH VOLTAGE ENERGY CAPACITOR
William Kameron, New Bedford, Mass., assignor to Aerovox Corporation, New Bedford, Mass., a corporation of Massachusetts
Filed Nov. 18, 1968, Ser. No. 776,674
Int. Cl. H01g 1/00
U.S. Cl. 317—242                    2 Claims

ABSTRACT OF THE DISCLOSURE

A high voltage oil filled capacitor has a pressure relief valve in the housing. The valve automatically closes when excess pressure has been vented.

---

As conducive to an understanding of the invention, it is noted that in high voltage oil filled energy storage capacitors, due to the stress to which they are subjected by reason of the high voltage pulsations used to build up the charge across the capacitors, there is a buildup of gas pressure in the container with resultant outward bowing of the walls thereof.

As a result, the level of the oil in the container will drop, exposing the upper end of the capacitor section in the container so that a corona effect will occur with resultant breakdown of the capacitor.

It is accordingly among the objects of the invention to provide a high voltage energy storage capacitor which incorporates automatic pressure relief means which will operate when the pressure in the capacitor container exceeds a predetermined amount to relieve the pressure in the container and which will automatically close when excess pressure has been vented.

According to the invention, these objects are accomplished by the arrangement and combination of elements hereinafter described and more particularly recited in the claims.

In the accompanying drawings in which are shown one or more of various possible embodiments of the several features of the invention.

Figure 1:
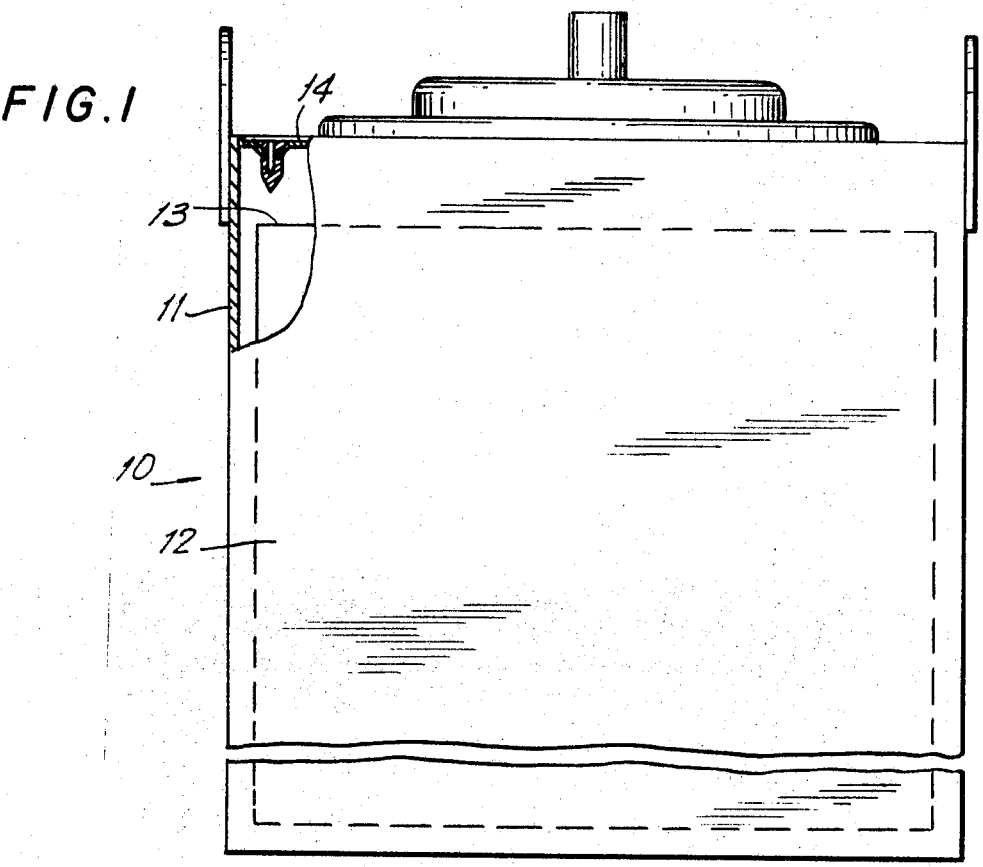
Figure 2:
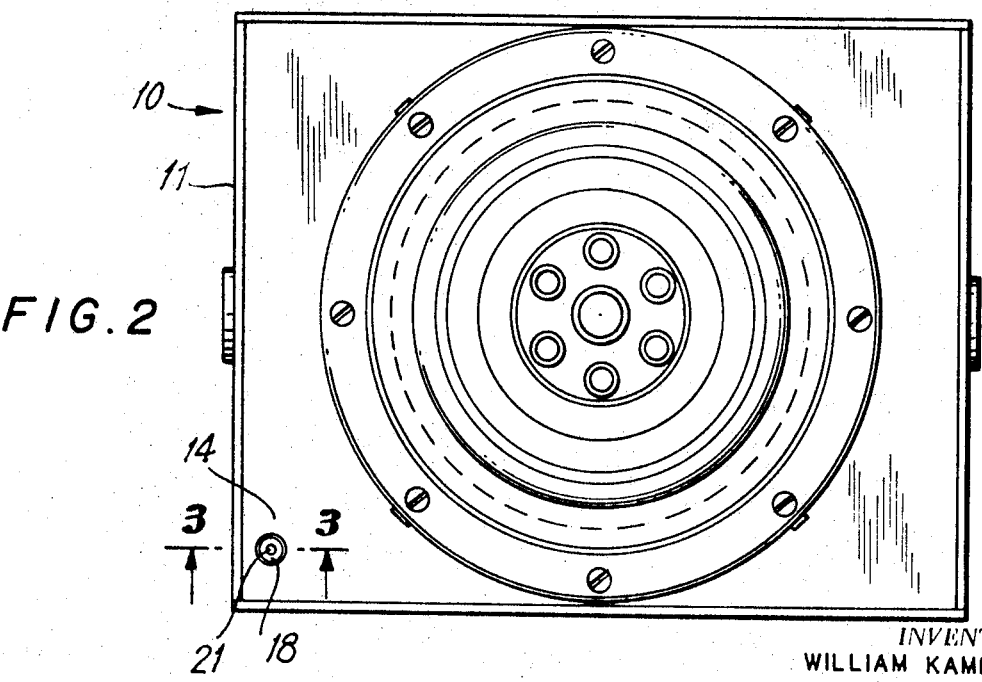
Figure 3:
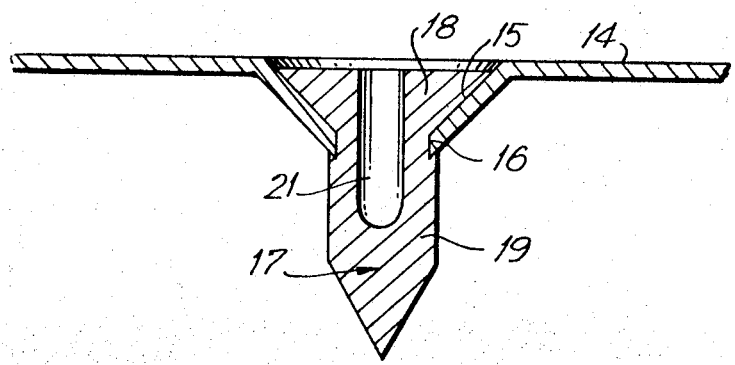
Figure 4:
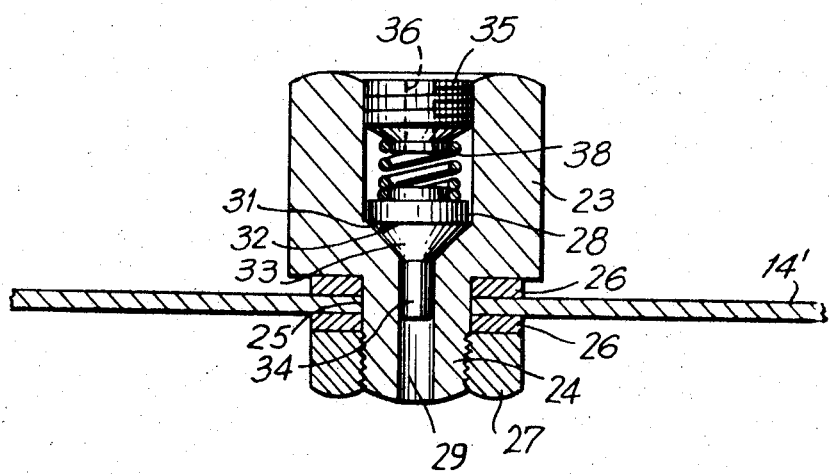

FIG. 1 is a side elevational view of a high voltage energy storage capacitor according to the invention, FIG. 2 is a top plan view thereof, FIG. 3 is a sectional view taken along line 3—3 of FIG. 2, and FIG. 4 is a view similar to FIG. 3 of another embodiment of the invention.

Referring now to the drawings, the capacitor 10 which is relatively large in size in the order of 28 inches high by 15 inches wide by 15 inches deep, has an outer container or casing 11, in which is positioned a capacitor section 12.

The upper end 13 of the capacitor section 12 is adjacent to the upper wall 14 of the casing 11 and the latter is filled with a dielectric oil that extends almost to the top wall 13 so that the capacitor section is completely immersed in such oil.

In use of such a capacitor which generally carries a charge of say 150,00 volts, the charge is built up by high voltage pulsations which causes a great deal of stress so that gas will develop in the casing with resultant rise in the internal pressure.

As a result of such pressure buildup, there is a tendency for the walls of the casing to bow outwardly which would cause the level of the oil to drop thereby exposing the upper end of the capacitor section. Consequently, a corona effect will occur with resultant break down of the capacitor.

This problem is however, eliminated according to the invention by the provision of automatic pressure relief means.

Referring to FIGS. 1 to 3, the top wall 14 of the casing has a substantially conical depression 15 therein with an opening 16 at its lower end in which a vent plug 17 is positioned.

As shown in FIG. 3, the vent plug 17 has a substantially conical head 18 that is designed to seat on the surface of the conical depression 15 and a stem 19 which extends through opening 16. The plug has an axial bore 21 extending through the head 18 and adjacent portion of stem 19 and the stem is of larger diameter than opening 16 so that when forced thereinto the periphery of said opening will embed into the stem securely to retain the plug in position.

When the pressure buildup in the casing 11 exceeds a predetermined amount, the force exerted against the circumference or outer periphery of the stem 19 of plug 17 will cause the stem to collapse slightly, providing a passageway between the stem and the periphery of opening 16 for relief of pressure in the casing. The subsequent reduction in pressure will permit the stem 19 to expand to its normal condition to reseal the casing.

In the embodiment shown in FIG. 4, the valve is of the type which permits ready setting thereof for relief at a predetermined pressure that may be varied.

Thus, the valve comprises a body portion 23 having a reduced diameter stem 24 which extends through an opening 25 in the top wall 14' of the casing. The stem 24 is encompassed by a pair of washers 26 which straddle the top wall 14 and is retained in position by a lock nut 27.

The body portion 23 and stem 24 have an axial bore 28 therethrough of reduced diameter at its inner end as at 29 defining a beveled seat 31. A valve member 32 positioned in said bore 28 has a beveled head 33 normally retained on said seat 31 and a stem 34 positioned in the reduced diameter portion 29 of the bore 28.

The stem 34 and the periphery of head 33 fit with slight clearance in the associated portions of bore 28 so that when the beveled head 33 is moved off its seat 31 a passageway for venting of gas from the casing will be provided.

As shown in FIG. 4 a set screw 35 with an axial bore 36 therethrough is screwed into the internally threaded upper portion of bore 28 and reacts against coil spring 38 which normally retains the valve head 32 against its seat 31.

The tension of spring 38 may readily be adjusted by rotation of the set screw 35.

Thus, when the pressure in the casing exceeds a predetermined amount determined by the setting of set screw 35, the valve head 32 will move off its seat to relieve the pressure in the casing and the valve will seat to reseal the casing after the pressure has fallen.

The high voltage energy storage capacitor above described will thus provide automatic relief of pressure, thereby preventing bowing of the casing wall with resultant drop in the oil level and hence will prevent undesired corona effect and enhance the life of the capacitor.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A high voltage storage capacitor comprising a casing having a top wall, said casing having a capacitor section therein, a dielectric oil in said casing in which said capacitor section is immersed, said oil level being above the level of the upper end of said capacitor, said top wall having a substantially conical depression therein with an opening at its lower end, a compressible vent plug having a substantially conical head portion of configuration complementary to said depression and a stem portion extending through said opening, said stem portion being of diameter greater than that of said opening for secure retention therein, whereby when the pressure in said casing exceeds a predetermined amount, a portion of the periphery of said stem will be compressed to provide a vent passageway between the periphery of said opening and the compressed portion of said stem to relieve the pressure of said casing.

2. The combination set forth in claim 1 in which said plug had an axial bore extending through the head thereof and the adjacent portion of the stem.

References Cited

UNITED STATES PATENTS

| | | | |
|---|---|---|---|
| 1,059,003 | 4/1913 | Ruprecht | 517—233 |
| 1,589,659 | 6/1926 | Phillips | 137—543.17 |
| 2,571,893 | 10/1951 | Kendall | 137—525 |
| 2,711,498 | 6/1955 | Robinson | 317—260 X |
| 2,871,907 | 2/1959 | Loofbourrow | 137—525 X |
| 2,938,990 | 5/1960 | Levine | 137—525 X |
| 3,197,547 | 7/1965 | Peace | 317—242 X |

FOREIGN PATENTS 492,332  9/1938  Great Britain.

E. A. GOLDBERG, Primary Examiner

U.S. Cl. X.R.

137—525; 317—260